United States Patent Office 3,708,446
Patented Jan. 2, 1973

3,708,446

GRAFT COPOLYMERS OF XANTHOMONAS HYDROPHILIC COLLOID AND ACRYLIC MONOMER

David J. Pettitt, San Diego, Calif., assignor to Kelco Company, San Diego, Calif.

No Drawing. Filed Mar. 24, 1971, Ser. No. 127,796
Int. Cl. C08f *29/50*
U.S. Cl. 260—17.4 GC 37 Claims

ABSTRACT OF THE DISCLOSURE

Graft copolymers of a Xanthomonas hydrophilic colloid with an acrylic monomer. Method of making graft copolymers by treating a Xanthomonas hydrophilic colloid and an acrylic monomer in an aqueous medium in the presence of a ceric salt which is soluble in the acid corresponding to the acid anion in the ceric salt. The ceric salt is added in the form of a solution in the acid corresponding to the acid anion of the salt and the copolymerization is carried out under a protective atmosphere to exclude oxygen. The copolymerization may be carried out in a fermentation beer containing a Xanthomonas hydrophilic colloid as produced by the growth of Xanthomonas bacteria in the fermentation medium.

The present invention pertains to graft copolymers of a Xanthomonas hydrophilic colloid with an acrylic monomer and to a method for their preparation. Specifically, the invention pertains to graft copolymers of a *Xanthomonas campestris* colloid with acrylamide and a method for their preparation.

Xanthomonas hydrophilic colloids are known materials. Both the colloids and their method of preparation are described in a number of United States patents, e.g.:

United States Nos.: 3,232,929, 3,355,447, 3,391,060, 3,391,061, 3,433,708, 3,427,226.

As described in these prior patents, a Xanthomonas hydrophilic colloid is produced by the fermentation of a carbohydrate with a bacteria of the genus Xanthomonas. The fermentation medium, as stated, contains a carbohydrate, a nitrogen source, a source of magnesium ions, phosphorus, and water. During the course of the fermentation, the medium is aerated and the pH of the medium is maintained at about 6.5 to about 7.5.

The Xanthomonas hydrophilic colloid which is obtained from the fermentation is a colloidal polysaccharide polymer. By way of illustration, the *Xanthomonas campestris* colloid is a polymer containing mannose, glucose, potassium glucuronate and acetyl radicals. Various Xanthomonas hydrophilic colloids may be produced according to the general procedure described above. These colloids may be identified by reference to the Xanthomonas bacteria utilized in the preparation. Thus, typical Xanthomonas colloids include *Xanthomonas campestris, Xanthomonas carotae, Xanthomonas incanae, Xanthomonas begoniae* and *Xanthomonas malvacearum* hydrophilic colloid.

In the preparation of a graft copolymer of a Xanthomonas colloid in accord with the present invention, the Xanthomonas colloid is copolymerized with an acrylic monomer. The acrylic monomer may be defined in terms of the following generic formula:

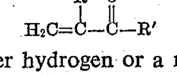

in which R is either hydrogen or a methyl group and R′ is $$—OH, —NH_2 \text{ or } —OR''$$

R″ is an alkyl group containing from about one to about ten carbon atoms or a hydroxyl alkyl group having the structure $$—alk(C_1–C_{10})—OH$$

In addition, R′ can have the structure

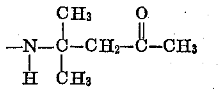

In the above formulas, the symbol "alk" indicates an alkyl group followed by a representation of the number of carbon atoms in the group denoted in parenthesis.

In performing the graft copolymerization reaction, both the Xanthomonas colloid and the acrylic monomer are present in an aqueous medium which can be the fermentation beer resulting from the preparation of the Xanthomonas colloid. The concentration of the Xanthomonas colloid generally ranges between about 1.0 and about 3.0% by weight of the water in the aqueous medium and it preferably ranges from about 2.0 to about 2.5% by weight of the water. The concentration of the acrylic monomer may range from as low as 0.5% to as high as 20% by weight of the water. Preferably, the concentration of the monomer is in the range of about 2.0 to about 10.0% by weight and more preferably from about 3 to about 6% by weight of the water in the aqueous medium.

Before addition of the ceric catalyst to the aqueous reaction medium, the medium is first purged with an inert gas such as nitrogen, argon, krypton, helium or the like to remove oxygen. If desired, the reaction system can first be evacuated prior to introduction of the inert gas or, conversely, the inert gas can be swept over the reaction medium to purge the system of oxygen. Following the removal of oxygen from the reaction system, the ceric catalyst is added. The ceric catalyst can be any ceric salt which is soluble in the acid corresponding to the acid anion present in the salt. Thus, for example, the ceric catalyst may be ceric nitrate, ceric sulfate, ceric chloride, or ceric perchlorate. The ceric salt is dissolved in the acid corresponding to the acid anion in the salt prior to its addition to the reaction medium. Thus, the ceric nitrate or ceric ammonium nitrate salt would be first dissolved in nitric acid; the ceric sulfate salt would be dissolved in sulfuric acid; the ceric chloride salt would be dissolved in hydrochloric acid, and the ceric perchloride salt would be dissolved in perchloric acid. The ceric salt is present in the reaction medium at a concentration which is effective to cause copolymerization of the Xanthomonas colloid with the acrylic monomer. By way of example, the concentration of the ceric salt in the reaction medium may range from about 0.05% to about 0.5% by weight and preferably from about 0.11 to about 0.33% by weight.

The pH of the reaction medium is controlled within the range from about 2 to about 5 by the addition of nitric, hydrochloric, sulfuric, or perchloric acid as outlined previously. The particular acid employed corresponds to the acidic anion present in the ceric salt. The weight ratio of the Xanthomonas colloid to the acrylic monomer used in the copolymerization reaction may be varied depending upon the properties desired in the graft copolymer product. In general, I have found that the weight ratio of Xanthomonas colloid to acrylic monomer can range from about 1:1 to about 1:10.

The copolymerization reaction may be conducted at a reaction temperature ranging from about 0 to about 60° C., and preferably about 20 to about 30° C. The reaction is generally initiated at about room temperature. The time required for the reaction may vary but is generally in the order of about two to about three hours. During the course of the reaction, the reaction medium becomes more viscous. Thus, the consistency of the reaction medium may be used as a criteria for determining the degree of completion of the reaction. When the reaction is completed, the pH is adjusted to about 5–8 and preferably about 7 by the addition of a suitable base such as sodium hydroxide, sodium bicarbonate, sodium carbonate, a sodium phosphate, the corresponding potassium salt of any of the foregoing, or ammonia. Also, if desired, a free radical inhibitor such as p-methoxyphenol, N,N'-di-sec-butyl-p-phenylenediamine, butylated hydroxytoluene, butylated hydroxyanisole or sodium bisulfite may be added.

Following this, the product may be separated from the reaction medium by precipitation through addition of a lower alcohol or ketone, and then dried in any suitable manner, such as by gentle heating.

To further illustrate my invention, there are presented the following examples in which all parts and percentages are by weight, unless otherwise indicated.

EXAMPLE I

To a 1000 milliliter reaction vessel equipped with a nitrogen inlet tube, a thermometer, and an addition funnel, was added 500 milliliters of a fermentation beer and 10 grams of acrylamide dissolved in 50 milliliters of water. The fermentation beer contained 2.34 weight percent of *Xanthomonas campestris* colloid, as determined by precipitation of colloid from a sample of the fermentation beer by the addition thereto of isopropyl alcohol. The reaction mixture was then heated to 75° C. while, at the same time, purging the reaction vessel with nitrogen gas for one hour. Thereafter, the reaction vessel was cooled to room temperature and 20 milliliters of a catalyst solution diluted with 50 milliliters of water was added over a period of 15 minutes while stirring. The catalyst solution was composed of 0.1 normal ceric ammonium nitrate dissolved in 1 normal nitric acid. This solution was made by dissolving 54.8 g. of ceric ammonium nitrate in 1 N nitric acid and diluting to make 1 liter of solution. Following the addition of the catalyst, stirring of the reaction mixture was continued for two hours at a reaction temperature of 20 to 25° C. after which two grams of p-methoxyphenol dissolved in 50 milliliters of isopropyl alcohol was added. The product was precipitated by the addition of excess isopropyl alcohol and was then collected and dried at 45–50° C. for two hours. There was obtained 20.1 grams of product which had a viscosity at a concentration of 1% by weight in distilled water of 508 centipoises (cps.). By way of comparison, *Xanthomonas campestris* colloid which was obtained directly from the fermentation beer had a viscosity at a concentration of 1% by weight in distilled water of 840 cps.

When Example I is repeated using methacrylamide, N-methyl acrylamide, or N[2-(2-methyl-4-oxopentyl)]-acrylamide, also called diacetone acrylamide, the *Xanthomonas campestris*-acrylate graft copolymer is obtained in good yield. Similarly, when ceric sulfate in sulfuric acid, ceric chloride in hydrochloric acid, or ceric perchlorate in perchloric acid is used as the polymerization catalyst in Example I, there is obtained the desired *Xanthomonas campestris*-acrylate graft copolymer.

EXAMPLE II

The reaction described in Example I was repeated with the exception that the quantity of the acrylamide reactant was 20 grams. The yield of the *Xanthomonas campestris*-polyacrylamide graft copolymer was 34.2 grams and the product had a viscosity of 187 cps. at a concentration of 1% by weight in distilled water.

EXAMPLE III

The procedure described in Example I was repeated using 30 grams of acrylamide as a reactant. There was obtained 45.0 grams of the graft copolymer product which had a viscosity of 112 cps. at a concentration of 1% by weight in distilled water.

EXAMPLE IV

The reaction described in Example I was repeated using 20 grams of acrylamide as a reactant. After addition of the catalyst solution, the reaction mixture was stirred for three hours at a temperature of 20 to 25° C. Following this, 1 gram of sodium bisulfite and 1 gram of sodium bicarbonate were added to the reaction mixture. After precipitation of the product by the addition of excess isopropyl alcohol followed by drying, as in Example I, the yield of product was 39.0 grams and the product had a viscosity of 342 cps. at a concentration of 1% by weight in distilled water.

EXAMPLE V

To 500 milliliters of a fermentation beer contained in a reaction vessel, as described in Example I, was added 25 grams of acrylic acid in 75 milliliters of distilled water. The mixture was heated to 75° C. for one hour under a nitrogen atmosphere and then cooled to 25° C. under nitrogen. Following this, 20 milliliters of the catalyst solution described in Example I in admixture with 30 milliliters of distilled water was added over a period of 15 minutes with stirring. Stirring of the reaction mixture was then continued for two hours under nitrogen after which 2 grams of p-methoxyphenol in 25 milliliters of isopropyl alcohol was added. After precipitation of the product by the addition of excess isopropyl alcohol followed by drying, the yield of the product was 24.9 grams. The product had a viscosity of 308 cps. at a concentration of 1% by weight in distilled water after adjusting the pH of the solution to 7 by the addition of sodium bicarbonate. The concentration of the *Xanthomonas campestris* colloid in the fermentation beer employed in the reaction was 2.16% by weight, as determined in the manner described in Example I.

When Example V is repeated using methacrylic acid as the acrylic monomer, the *Xanthomonas campestris* acrylate graft copolymer is obtained. Also, the use of Xanthomonas colloids other than the *Xanthomonas campestris* colloid in Example V produces the Xanthomonas colloid-acrylate graft copolymer—e.g., *Xanthomonas carotate*-acrylate copolymer, *Xanthomonas begoniae*-acrylate copolymer, *Xanthomonas incanae*-acrylate copolymer and *Xanthomonas malvacearum*-acrylate graft copolymer.

EXAMPLE VI 50 grams of acrylamide and 12.5 grams of acrylic acid were added to 500 milliliters of a fermentation beer containing 2.0% by weight of *Xanthomonas campestris* colloid. After heating the mixture to 75° C. for one hour followed by cooling to 25° C. (all under a nitrogen atmosphere in a reaction vessel as described in Example I) there were added 20 milliliters of the catalyst solution prepared as in Example I, diluted with 25 milliliters of distilled water. The addition was made over a period of 15 minutes with stirring. After addition of the catalyst solution, the mixture was stirred for three hours after which 17 grams of sodium bicarbonate in 100 milliliters of water was added. The product was then precipitated by the addition of excess isopropyl alcohol and the product was then dried for three hours at a temperature of about 45 to 50° C. The product had a viscosity of 548 cps. at a concentration of 1% by weight in distilled water and the yield of the product was 97.6 grams.

EXAMPLE VII

To a reaction vessel, as described in Example I, containing 500 milliliters of a fermentation beer there was added 20 grams of acrylamide and 10 grams of diacetone acrylamide in 250 milliliters of water. The fermentation beer contained 1.2% by weight of *Xanthomonas campestris* colloid, as determined in the manner described in Example I. The reaction mixture was then purged with nitrogen at a temperature of 25° C. for 1½ hours and 10 milliliters of catalyst solution in 25 milliliters of water was added over a period of 15 minutes with stirring. The catalyst solution employed was the same as that described in Example I. After stirring the reaction mixture for 2½ hours at a reaction temperature of 20 to 25° C. under nitrogen, 1 gram of sodium bicarbonate was added. The product was then precipitated by the addition of isopropyl alcohol and dried. The yield of the product was 36.0 grams and the product had a viscosity of 183 centipoises at a concentration of 1% by weight in distilled water.

EXAMPLE VIII

The procedure described in Example VII was repeated using as the acrylic monomer a mixture of 10 grams of acrylamide and 10 grams of diacetone acrylamide. The yield of the product was 18.7 grams and the product had a viscosity of 319 cps. at a concentration of 1% by weight in distilled water.

The fermentation beer, containing the Xanthomonas colloid, which may be used as the reaction medium for my copolymerization reaction, is a complex mixture containing various inorganic salts such as ammonium or alkali metal phosphates and nitrates and alkaline earth phosphates, nitrates or sulfates. Organic components may include protein which may be present as enzymes such as cellulase. A variety of organic acids and their salts may be present and also some sugars may be present. Typically, such a fermentation beer contains an alkali metal phosphate, ammonium nitrate, magnesium sulfate, cellulase and other enzymes produced by the bacteria, a small amount of residual sugar and some salts of organic acids produced as by-products of the bacterial fermentation.

My graft copolymerization reaction may, of course, also be carried out in water. However, it is most conveniently carried out in a fermentation beer containing the Xanthomonas colloid since this eliminates the step of separating the Xanthomonas colloid from the beer prior to its use as a reactant in my process. In view of the complexity of the fermentation beer in terms of its chemical composition, it is quite surprising that the copolymerization reaction can be carried out in the beer. The fact that the reaction can be carried out in the beer represents a substantial advantage.

The properties of my graft copolymers are highly advantageous in that the copolymers retain many of the desirable characteristics of the Xanthomonas colloids while, at the same time, having properties which are altered from those of the colloid. Like the Xanthomonas colloids, my graft copolymers provide aqueous viscosities which are highly pseudoplastic; i.e., their viscosities vary inversely with respect to shear. As the shear force applied to an aqueous medium containing the graft copolymer is increased, the viscosity of the medium is immediately decreased. Conversely, as the shear applied to the aqueous medium is decreased, the viscosity of the aqueous medium is immediately increased. The property of pseudoplasticity is highly advantageous, for example, in an aqueous drilling mud since it provides the mud with a high viscosity when at rest, or near rest, such that it can suspend cuttings and weighting agents within the mud. Yet, at the same time, such a drilling mud is easily pumped and provides satisfactory lubrication of the drill bit since its viscosity immediately drops when it is subjected to shear forces in a pump or at the bit. Thus, may graft copolymers may be employed as additives to aqueous drilling fluids to provide pseudoplastic viscosity characteristics in the fluids.

The aqueous viscosities of my graft copolymers are lower than the viscosities of the Xanthomonas colloids used in their preparation and the viscosity of the copolymer is determined by the weight ratio of the acrylate to the Xanthomonas colloid in the copolymer. As the weight ratio of the acrylate to Xanthomonas colloid in the copolymer is increased, the aqueous viscosity of the copolymer is reduced. Thus, for example, the viscosity of *Xanthomonas campestris* hydrophilic colloid at a concentration of 1% by weight in aqueous media is about 1000 cps. while the 1% aqueous viscosities of *Xanthomonas campestris*-polyacrylamide graft copolymers are about 500 cps., about 300 cps., and about 100 cps. at weight ratios of polyacrylamide to Xanthomonas colloid of 1:1, 2:1, and 3:1, respectively. By adjusting the acrylate to Xanthomonas colloid weight ratio in my graft copolymers, I am able to provide products having a wide range of viscosities.

My graft copolymers are quite stable in aqueous media to changes in pH. Between a pH of 2 and a pH of 12, their viscosities are virtually unaffected while at a pH of 1 or a pH of 13 there was a drop in viscosity of about 20 percent. Also, my graft copolymers were found to be relatively unreactive with salts, namely, sodium sulfate, calcium chloride and chromium chloride. The addition of these salts in 0.5 gram increments to a 2% by weight aqueous solution of a graft copolymer having a 2:1 weight ratio of polyacrylamide to *Xanthomonas campestris* colloid caused only a slight viscosity increase.

The presence of locust bean gum with my graft copolymers in aqueous media was found to cause greatly increased thickening or the formation of a gel. Thus, my invention includes compositions which are mixtures of locust bean gum with my graft copolymers in which the locust bean gum is present in an amount sufficient to cause a synergistic thickening when the mixture is added to an aqueous medium. By way of example, the locust bean gum may be present in an amount sufficient to produce a viscosity increase in the aqueous medium of about 20 cps. or more than the additive effect of the viscosities produced by the individual components in the aqueous medium. By way of example, such mixtures may have a weight ratio of locust bean gum to graft copolymer ranging from about 0.1:1 to about 10:1. These ratios are merely illustrative since the locust bean gum can be present in any amount which is effective to increase the viscosity of my graft copolymer or to form a gel with it when copresent in an aqueous medium.

The concentration of my graft copolymers, when present in an aqueous medium to produce thickening, can range from about 0.1 to about 10% by weight of the water in the medium.

The above described properties of my graft copolymers make them admirably suited for use as textile print paste thickeners.

I claim:

1. A process for preparation of a Xanthomonas colloid-polyacrylic graft copolymer, said process comprising reacting a Xanthomonas colloid with an acrylic monomer in an aqueous medium, said reaction being carried out under conditions to exclude oxygen and in the presence of a ceric salt catalyst at a concentration which is effective to cause copolymerization of said Xanthomonas colloid with said acrylic monomer, maintaining the pH of the reaction medium at about 2 to about 5 by the addition of an acid corresponding to the acidic anion present in said ceric salt, said reaction being carried out at a reaction temperature from about 0 to about 60° C., with said acrylic monomer having the formula:

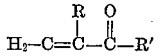

in which R is either hydrogen or a methyl group, R′ is —OH, —$NH_2$, —OR″, or

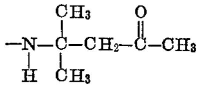

and R″ is an alkyl group containing from 1 to about 10 carbon atoms or a hydroxyalkyl group containing from 1 to about 10 carbon atoms, wherein the concentration of Xanthomonas colloid in the reaction medium ranges from about 1 to about 3% by weight of the water and the concentration of acrylic monomer in the reaction medium ranges from about 0.5% to about 20% by weight of the water.

2. The process of claim 1 wherein the reaction is carried out in the presence of an inert gas.

3. The process of claim 1 wherein said Xanthomonas colloid is a *Xanthomonas campestris* colloid.

4. The process of said claim 1 wherein said ceric salt catalyst is ceric nitrate, ceric sulfate, ceric chloride, or ceric perchlorate.

5. The process of claim 1 wherein the concentration of said ceric salt in the reaction medium ranges from about 0.05% to about 0.5% by weight.

6. The process of claim 1 wherein the reaction is conducted at a temperature of about 20 to about 30° C.

7. The process of claim 1 wherein a free radical inhibitor is present in the reaction medium.

8. The process of claim 1 wherein said acrylic monomer is acrylamide, methacrylamide, N-methyl acrylamide, acrylic acid or mixtures thereof.

9. The process of claim 3 wherein said acrylic monomer is acrylamide, methacrylamide, N-methyl acrylamide, acrylic acid or mixtures thereof.

10. The process of claim 1 wherein the acrylic monomer is acrylamide.

11. The process of claim 3 wherein the acrylic monomer is acrylamide.

12. The process of claim 1 wherein the concentration of said acrylic monomer is about 2 to about 10% by weight of the water in said aqueous medium.

13. The process of claim 1 wherein the concentration of said acrylic monomer is about 3 to about 6% by weight of the water in said aqueous medium.

14. The process of claim 1 wherein said aqueous medium is a fermentation beer containing the Xanthomonas colloid.

15. The process of claim 3 wherein said aqueous medium is a fermentation beer containing the *Xanthomonas campestris* colloid.

16. A Xanthomonas colloid-polyacrylic graft copolymer wherein the weight ratio of Xanthomonas colloid to acrylic monomer ranges from about 1:1 to about 1:10 prepared according to the process of claim 1.

17. The graft copolymers of claim 16, wherein said Xanthomonas colloid is a *Xanthomonas campestris* colloid.

18. The graft copolymers of claim 16 wherein the acrylic monomer is acrylamide, methacrylamide, N-methyl acrylamide, acrylic acid or mixtures thereof.

19. The graft copolymers of claim 16, wherein said acrylic monomer is acrylamide.

20. The graft copolymers of claim 17, wherein said acrylic monomer is acrylamide.

21. The graft copolymers of claim 16, wherein the weight ratio of Xanthomonas colloid to acrylic monomer is about 1:1 to about 1:3.

22. An aqueous medium containing a Xanthomonas colloid-polyacrylic graft copolymer as defined in claim 1 wherein the concentration of said graft copolymer in said aqueous medium ranges from about 0.1% to about 10% by weight of the water present therein.

23. The composition of claim 22 wherein the Xanthomonas colloid present in said graft copolymer is a *Xanthomonas campestris* colloid.

24. The composition of claim 22 wherein the acrylic monomer present in said graft copolymer is acrylamide, methacrylamide, N-methylacrylamide, acrylic acid, or mixtures thereof.

25. The composition of claim 22 wherein the acrylic monomer present in said graft copolymer is acrylamide.

26. The composition of claim 23 wherein the acrylic monomer present in said graft copolymer is acrylamide.

27. A composition comprising locust bean gum in admixture with a Xanthomonas colloid-polyacrylic graft copolymer wherein the weight ratio of Xanthomonas colloid to acrylic monomer ranges from about 1:1 to about 1:10, said copolymer having been prepared according to claim 1.

28. The composition of claim 27 wherein said Xanthomonas colloid is a *Xanthomonas campestris* colloid.

29. The composition of claim 27 wherein said acrylic monomer is acrylamide.

30. The composition of claim 28 wherein said acrylic monomer is acrylamide.

31. The composition of claim 27 wherein the weight ratio of locust bean gum to said graft copolymer ranges from about 0.1:1 to about 10:1.

32. An aqueous medium containing the composition defined in claim 27 in an amount sufficient to increase the viscosity of said medium.

33. The composition of claim 32 wherein said Xanthomonas colloid is a *Xanthomonas campestris* colloid.

34. The composition of claim 32 wherein said acrylic monomer is acrylamide.

35. The composition of claim 33 wherein said acrylic monomer is acrylamide.

36. The composition of claim 32 wherein the weight ratio of locust bean gum to said graft copolymer ranges from about 0.1:1 to about 10:1.

37. The composition of claim 32 wherein said graft copolymer is present in an amount ranging from about 0.1 to about 10% by weight of the water present therein.

References Cited

Chem. Abstr., vol. 67: 75061n, Deily et al., "New Biopolymer . . . Drilling Operation."

Chem. Abstr., vol. 69: 54581h, Kelco Co., "Heat Reversible Gel."

WILLIAM H. SHORT, Primary Examiner

E. WOODBERRY, Assistant Examiner